(12) United States Patent
Ng et al.

(10) Patent No.: US 10,032,555 B2
(45) Date of Patent: Jul. 24, 2018

(54) CURRENT REGULATOR WITH FEEDBACK CIRCUIT FOR AC COUPLING

(71) Applicant: HALLIBURTON ENERGY SERVICES, INC., Houston, TX (US)

(72) Inventors: Isaac Ng, Singapore (SG); Abdul Qadir Shabbir, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 30 days.

(21) Appl. No.: 15/036,266

(22) PCT Filed: Mar. 11, 2014

(86) PCT No.: PCT/US2014/023526
§ 371 (c)(1),
(2) Date: May 12, 2016

(87) PCT Pub. No.: WO2015/137927
PCT Pub. Date: Sep. 17, 2015

(65) Prior Publication Data
US 2016/0301321 A1  Oct. 13, 2016

(51) Int. Cl.
*H01F 27/42* (2006.01)
*G05F 1/13* (2006.01)
(Continued)

(52) U.S. Cl.
CPC .............. *H01F 27/42* (2013.01); *G05F 1/13* (2013.01); *H02M 1/08* (2013.01); *H02M 5/04* (2013.01); *H02M 2001/0009* (2013.01)

(58) Field of Classification Search
CPC ...... H01F 27/42; H01F 27/425; H01F 27/427; H01F 38/36; H01F 38/32; H01F 38/30;
(Continued)

(56) References Cited

U.S. PATENT DOCUMENTS 5,266,887 A    11/1993  Smith
2004/0075600 A1*  4/2004  Vera .................. H02J 1/102
                                                 341/166
(Continued)

OTHER PUBLICATIONS

International Patent Application No. PCT/US2014/023526, International Search Report and Written Opinion, dated Nov. 26, 2014, 11 pages.

*Primary Examiner* — Kyle J Moody
*Assistant Examiner* — Kevin H Sprenger
(74) *Attorney, Agent, or Firm* — Kilpatrick Townsend & Stockton LLP

(57) ABSTRACT

A current regulator for regulating alternating current (AC) flow to a load device is provided. The current regulator can include an AC coupling device that can be electrically connected to the load device via an output electrical path, a current control device electrically connected in series with the AC coupling device, and an AC feedback circuit electrically connected to the output electrical path and the current control device. The current control device can modify a current flow through at least one component of the AC coupling device in response to receiving an error correction current. An output AC current provided to the load device can be controlled based on the current flow through the component of the AC coupling device. The AC feedback circuit can include voltage error compensation device that provides the error correction current in response to receiving a feedback voltage corresponding to the output AC current.

20 Claims, 3 Drawing Sheets

(51) Int. Cl.
*H02M 1/08* (2006.01)
*H02M 5/04* (2006.01)
*H02M 1/00* (2006.01)

(58) Field of Classification Search
CPC ........ H01F 38/28; G05F 1/12; H04M 19/003;
G01R 15/185; G01R 15/183; G01R
15/18; G01R 15/142; H02M 5/04
USPC ................ 323/222, 249, 254, 277, 356–358;
363/74, 75, 79, 153
See application file for complete search history.

(56) References Cited

U.S. PATENT DOCUMENTS

| | | |
|---|---|---|
| 2011/0170319 A1 | 7/2011 | Tumminaro et al. |
| 2011/0176337 A1 | 7/2011 | Young |
| 2013/0070379 A1 | 3/2013 | Pan et al. |
| 2013/0100711 A1 | 4/2013 | Langeslag et al. |
| 2013/0335043 A1 | 12/2013 | He et al. |
| 2014/0313792 A1* | 10/2014 | Nate ................ H02M 3/33523 363/21.15 |
| 2015/0061622 A1* | 3/2015 | Bhattad .................. G05F 1/573 323/280 |

* cited by examiner

CURRENT REGULATOR WITH FEEDBACK CIRCUIT FOR AC COUPLING

CROSS-REFERENCE TO RELATED APPLICATIONS

This is a U.S. national phase under 35 U.S.C. 371 of International Patent Application No. PCT/US2014/023526, titled "Current Regulator with Feedback Circuit for AC Coupling" and filed Mar. 11, 2014, the entirety of which is incorporated herein by reference.

TECHNICAL FIELD

The present disclosure relates generally to electrical devices and, more particularly (although not necessarily exclusively), to a current regulator with feedback circuits for AC coupling.

BACKGROUND

Current regulation devices such as (but not limited to) amplifiers may be used in communication systems or other electrical systems. Current regulation devices may receive an input current or voltage from an input or voltage source and output a modified current.

In some implementations, current regulators may use transformers for outputting a modified current. A current regulator including transformers may use a feed forward implementation. A feed forward implementation may present limitations. One example of such a limitation is that output impedance and current regulation provided by a transformer may be lower than desired. Another limitation is that an output current may include signal-dependent distortion noise and intermodulation products.

DETAILED DESCRIPTION

Figure 1:
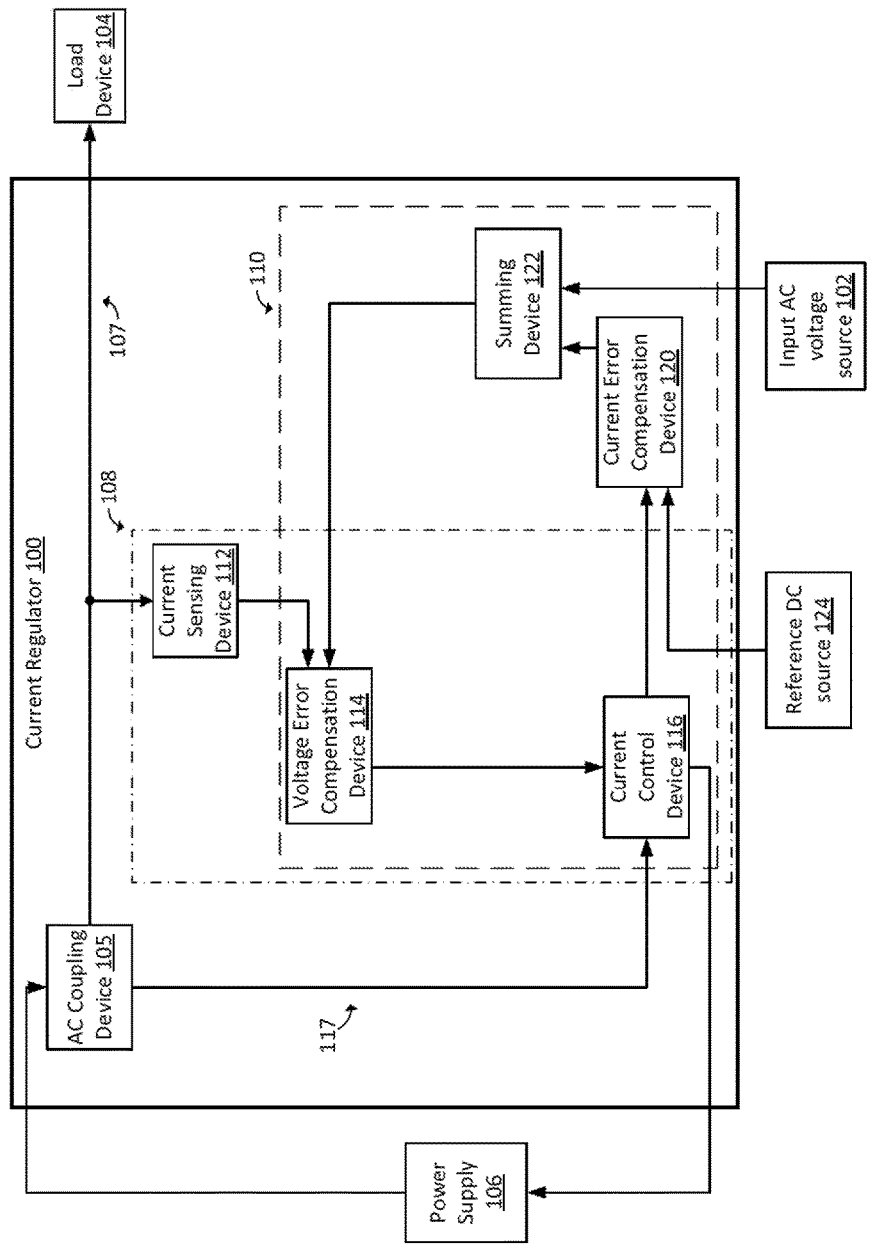
FIG. 1 is a block diagram of an example of a current regulator having feedback circuits allowing AC coupling according to one aspect of the present disclosure.

Certain aspects and features of the present disclosure are directed to a current regulator having feedback circuits allowing alternating current ("AC") coupling. For example, an amplifier or other current regulating device can include an AC coupling device such as a transformer for providing an output current to a load device. The amplifier or other current regulator can use a feedback voltage to determine a difference between a specified output current for the amplifier and a measured output current. The difference between the specified output current and the measured output current can be used to generate an error correction voltage. The error correction voltage can cause one or more components of the amplifier or other current regulator to increase or decrease the output current.

In accordance with some aspects, a current regulator for regulating an output AC current to a load device is provided. The current regulator can include an AC coupling device that can be electrically connected to the load device via an output electrical path, a current control device electrically connected in series with the AC coupling device, and an AC feedback circuit electrically connected to the output electrical path and the current control device. An AC coupling device can include any device configured for coupling AC current to an electrical path and rejecting direct current ("DC") components. A non-limiting example of an AC coupling device is a power transformer. The current control device can modify a current flow through at least one component of the AC coupling device in response to receiving an error correction current. An output AC current provided to the load device can be controlled based on the current flow through the component of the AC coupling device.

In a non-limiting example, the AC coupling device may be a power transformer that includes a primary coil in series with the current control device and a secondary coil in the output electrical path. The output AC current can be provided to the output electrical path by providing a current through the primary coil and thereby inducing the output AC current in the secondary coil. The current flow through the power transformer can be controlled by the current control device. For example, the current control device can include a transistor. A collector of the transistor can be connected in series with the primary coil. A current provided to the base of the transistor can control the current flow through the collector and emitter of the transistor, thereby controlling the current flow through the primary coil of the power transformer.

The AC feedback circuit can provide an error correction current for controlling the current control device. For example, the AC feedback circuit can include a differential amplifier or other voltage error compensation device. The voltage error compensation device can compare an input AC voltage used to generate the output AC current and a feedback voltage that corresponds to the output AC current. The voltage error compensation device can output the error correction current based on a comparison between the input AC voltage and the feedback voltage. For example, the feedback voltage exceeding the input AC voltage can indicate that the output AC current level is too high. The feedback voltage exceeding the input AC voltage can cause the voltage error compensation device to output a reduced error correction voltage and thereby decrease a corresponding error correction current. The decreased error correction current can be provided to the current control device (e.g., a base of a transistor connected in series with a primary coil of a power transformer).

In some aspects, the current regulator can also include a DC feedback circuit for eliminating DC offsets in the input AC voltage. For example, one or more components of the current regulator may introduce a DC component into the input AC voltage. A DC component into the input AC voltage may cause saturation of the current regulator. A DC feedback circuit between the output of the voltage error compensation device and the input of the voltage error compensation device can reduce or eliminate such DC components. For example, the DC feedback circuit may include one or more components configured for providing a DC voltage that is equal in magnitude and opposite in polarity to DC offsets in the input AC voltage. A summing device between the voltage error compensation device and the source of the input AC voltage can combine the provided DC voltage and the input AC voltage. Combining the DC voltage and the input AC voltage using a summing device can cancel a DC component of the input AC voltage having a polarity opposite that of the DC voltage.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects. Like the illustrative aspects, the numerals and directional descriptions included in the following sections should not be used to limit the present disclosure.

FIG. 1 is a block diagram of an example of a current regulator 100 having feedback circuits allowing AC coupling according to one aspect. A non-limiting example of a current regulator 100 is an amplifier. The current regulator 100 can be electrically coupled to an input AC voltage source 102 and to a load device 104. In a non-limiting sample, an output AC current can be generated from an input AC signal voltage received from the input AC voltage source 102. The current regulator 100 can provide the output AC signal current to the load device 104. The current regulator 100 can regulate the flow of the output AC current provided to a load device 104.

The current regulator 100 can also be coupled to a power supply 106. The power supply 106 can provide one or more voltages or currents to one or more components of the current regulator 100 via one or more supply rails.

The current regulator 100 can be coupled to the load device 104 via an AC coupling device 105. The AC coupling device 105 can include any component or group of components that can couple or otherwise provide an electrical current to the load device 104 via an output electrical path 107. The AC coupling device 105 can reject DC components or low frequency components from an output AC current provided to the load device 104. A non-limiting example of an AC coupling device 105 is a transformer.

The current regulator 100 can also include an AC feedback circuit 108 and a DC feedback circuit 110. The AC feedback circuit 108 can include a current sensing device 112, a voltage error compensation device 114, and a current control device 116. The AC feedback circuit 108 can compensate for limitations of the AC coupling device 105 that may otherwise present disadvantages in using an AC coupling device in the current regulator 100. For example, in the absence of an AC feedback path, a non-linear characteristic of an AC coupling device such as a transformer may generate noise or other distortion in the output AC current. The DC feedback circuit 110 can include the voltage error compensation device 114, the current control device 116, a current error compensation device 120, and a summing device 122. For example, the DC feedback circuit 110 can reduce or prevent saturation of the current amplifier caused by a DC component in the input AC voltage.

The current sensing device 112 can sample at least a portion of the output current from the output electrical path 107 between the AC coupling device 105 and the load device 104. The current sensing device 112 can convert the sampled current to a feedback voltage. The feedback voltage can be provided to an input of the voltage error compensation device 114.

The voltage error compensation device 114 can compare the feedback voltage with an input AC voltage from the input AC voltage source 102. In some aspects, the input voltage received by the voltage error compensation device 114 can be modified using the DC feedback circuit 110, as described in detail below. The voltage error compensation device 114 can output an error correction voltage based on a comparison of the feedback voltage and the input AC voltage.

The error correction voltage or a current corresponding to the error correction voltage can be provided the current control device 116. A non-limiting example of a current control device 116 is a current mirror. The error correction voltage or the current corresponding to the error correction voltage provided to the current control device 116 can control an amount of current that is provided to the output electrical path 107 by the AC coupling device 105.

In a non-limiting example, an electrical path 117 can include one or more components of the AC coupling device 105 connected in series with one or more components of the current control device 116. The power supply 106 can provide power, voltage, or current to the one or more components of the AC coupling device 105 in the electrical path 117 such that a current may flow through the one or more components of the AC coupling device 105 in the electrical path 117. The current control device 116 can control an amount of current flowing through the component of the AC coupling device 105 in the electrical path 117. The output AC current provided to the output electrical path 107 can depend upon the current flowing through the one or more components of the AC coupling device 105 in the electrical path 117. Controlling the amount of current flowing through the component of the AC coupling device 105 in the electrical path 117 can thereby control the output AC current in the output electrical path 107.

The DC feedback circuit 110 can be used to cancel or otherwise reduce DC components in the input AC voltage. The current error compensation device 120 of the DC feedback circuit 110 can be coupled to the current control device 116 and a reference DC source 124. The current control device 116 can provide a current or voltage to the current error compensation device 120. The current or voltage provided to the current error compensation device 120 can correspond to a DC component of the error correction voltage. The reference DC source 124 can provide a DC reference current or voltage.

The current error compensation device 120 can compare current or voltage from the current control device 116 to the reference current or voltage from the reference DC source 124. The reference DC current or voltage can be selected such that a DC feedback current or voltage outputted from the current error compensation device 120 has an equal magnitude and opposite polarity of a DC component of the input AC voltage. The current error compensation device 120 can provide the DC feedback voltage to the summing device 122.

The summing device 122 can sum the DC feedback voltage and the input AC voltage. Summing the DC feedback voltage having an equal magnitude and opposite polarity of the DC component of the input AC voltage can cancel or otherwise reduce the DC component of the input AC voltage. Canceling or otherwise reducing the DC component of the input AC voltage can prevent or otherwise reduce saturation of the current regulator 100.

Figure 2:
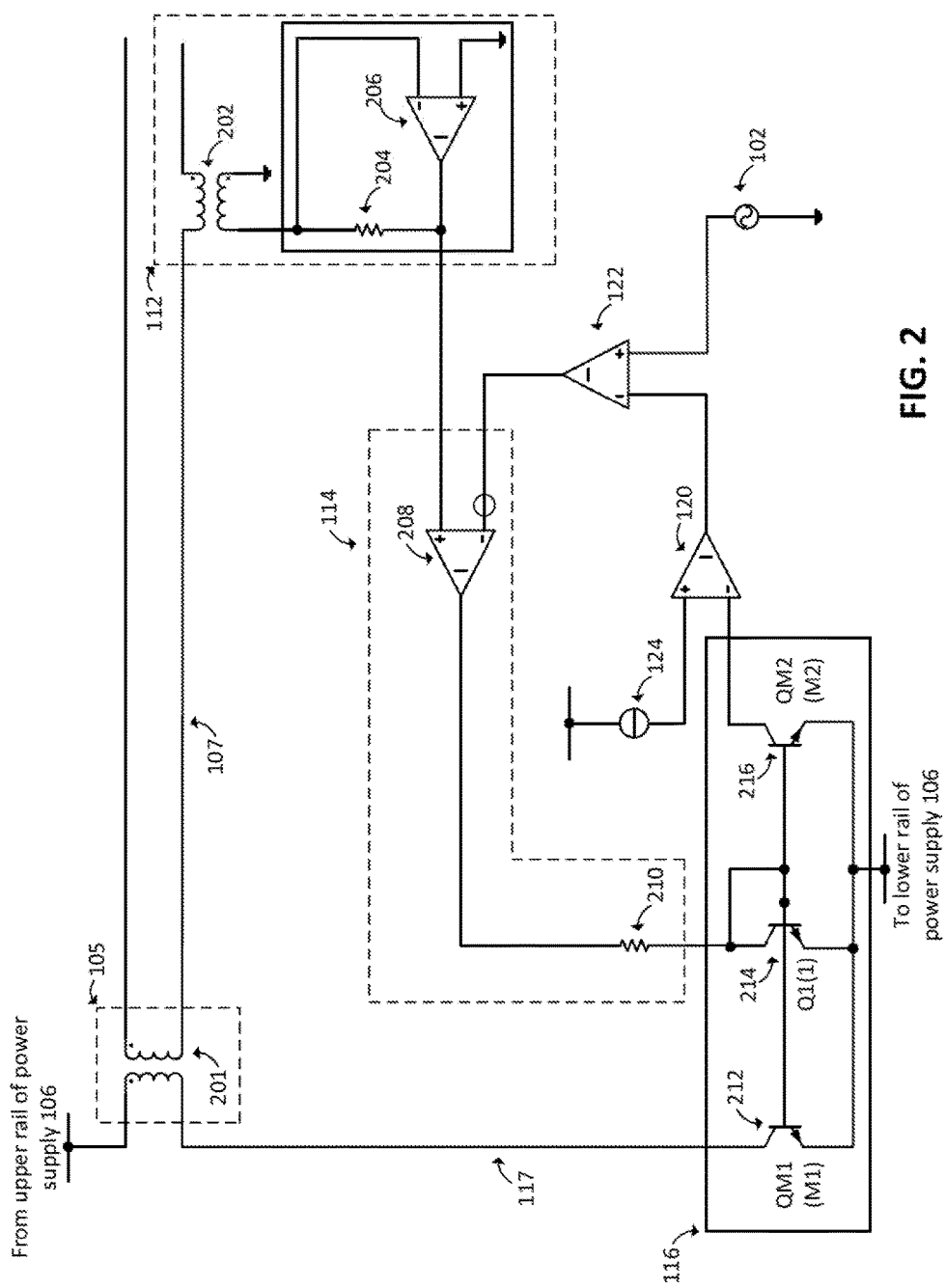
FIG. 2 is a schematic diagram of an example of a current regulator having feedback circuits allowing AC coupling according to one aspect of the present disclosure.

Any suitable circuit components can be used to implement the current regulator 100. For example, FIG. 2 is a schematic diagram of an example of a current regulator 100 having feedback circuits allowing AC coupling according to one aspect. The AC coupling device 105 can include a power transformer 201. The current sensing device 112 can include a current transformer 202, a current sense resistor 204, and a differential amplifier 206. The voltage error compensation device 114 can include a differential amplifier 208 and a current limiting resistor 210. The current control device 116 can be a current mirror that includes transistors 212, 214, 216. The current error compensation device 120 can be a differential amplifier. The summing device 122 can be a signal summer.

In a non-limiting example, a primary coil of the power transformer 201 can be connected to an upper rail of the power supply 106 in the electrical path 117. The connection to the upper rail of the power supply 106 can cause current to flow through the primary coil of the power transformer 201. The current flowing through the primary coil of the power transformer 201 can induce an output current in the secondary coil of the power transformer 201. The secondary current induced in the secondary coil of the power transformer 201 can be the output AC current provided to the load device 104.

The current transformer 202 can use the output AC current induced by the power transformer 201 to provide a feedback current to the AC feedback circuit 108. The output AC current can flow through a primary coil of the current transformer 202. The output AC current flowing through the primary coil of the current transformer 202 can induce the feedback current in the secondary coil of the current transformer 202. The feedback current flowing through the secondary coil of the current transformer 202 can be proportionate to or otherwise correspond to the output AC current flowing through the primary coil of the current transformer 202. The feedback current being proportionate to or otherwise corresponding to the output AC current can allow the AC feedback circuit 108 to adjust the output AC current to obtain a specified current level. The current sense resistor 204 and the differential amplifier 206 can use the feedback current to provide a feedback voltage to the positive input of the differential amplifier 208.

The differential amplifier 208 can compare the feedback voltage with a voltage received from the input AC voltage source 102 via the summing device 122. The differential amplifier 208 can output an error correction voltage.

An error correction current corresponding to the error correction voltage can be provided via the current limiting resistor 210 to the bases of the respective transistors 212, 214, 216. The error correction current applied to the base of the transistor 212 can control an amount of current flowing through the transistor 212. Controlling an amount of current flowing through the transistor 212 can thereby control the current flow from an upper rail of the power supply 106 through a primary coil of the power transformer 201.

Figure 3:
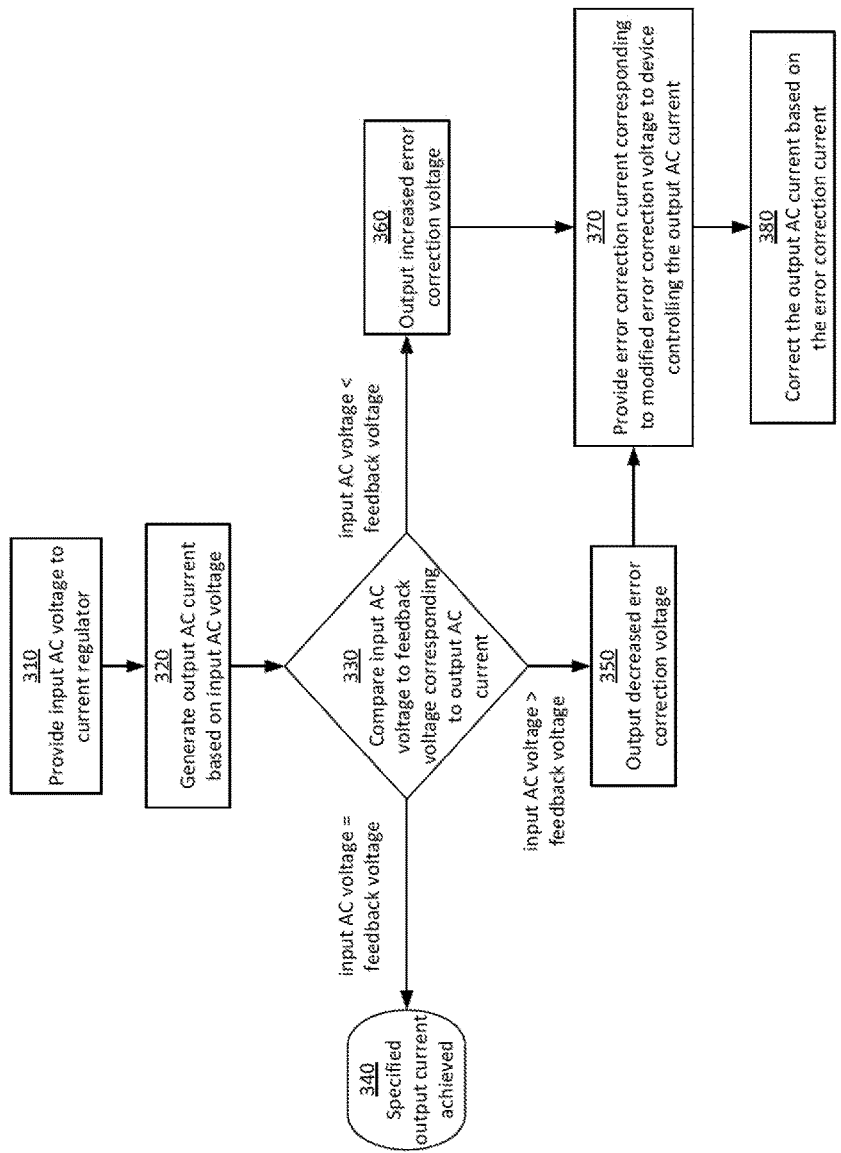
FIG. 3 is a flow chart depicting an example of a process for regulating current flow using an AC feedback circuit.

FIG. 3 is a flow chart depicting an example of a process 300 for regulating current flow using an AC feedback circuit 108. The process 300 is described with respect to the current regulator 100 depicted in FIGS. 1-2. However, other implementations can be used.

The process 300 involves providing an input AC voltage to a current regulator 100, as depicted in block 310. For example, the AC voltage source 102 that is electrically connected to an input of the current regulator 100 can provide an input AC voltage to the current regulator 100.

The process 300 also involves generating an output AC current based on the input AC voltage, as depicted in block 320. For example, an AC coupling device 105 can be used to provide an output AC current to a load device 104. In some aspects, an upper rail of a power supply 106 can provide a current to an electrical path 117 that includes a primary coil of the power transformer 201 and a transistor 212 or other component of a current control device 116. The current flowing through the primary coil of the power transformer 201 can induce output AC current in the secondary coil of the power transformer 201. The transistor 212 or component of the current control device that controls current flow through the electrical path 117 can thus influence the magnitude of the output AC current.

The process 300 also involves comparing the input AC voltage to a feedback voltage that corresponds to the output AC current, as depicted in block 330. For example, a voltage error compensation device 114 can include a differential amplifier 208. The feedback voltage can be provided to the positive input of the differential amplifier 208. The input AC voltage can be provided to the negative input of the differential amplifier 208.

In some aspects, the DC feedback circuit 110 can reduce or eliminate one or more DC offsets in the input AC voltage. The input AC voltage outputted from the summing device 112 of the DC feedback circuit 110 can be compared to the feedback voltage.

If the input AC voltage is equal to the feedback voltage, the process 300 has achieved a specified output AC current, as depicted in block 340.

If the input AC voltage is greater than the feedback voltage, the process 300 involves outputting a decreased error correction voltage from the differential amplifier 208 or other voltage error compensation device 114, as depicted in block 350. The decrease in the error correction voltage can cause the output AC current level to be reduced, as described in detail below.

If the input AC voltage is less than the feedback voltage, the process 300 involves outputting an increased error correction voltage from the differential amplifier 208 or other voltage error compensation device 114, as depicted in block 360. The increase in the error correction voltage can cause the output AC current level to be increased, as described in detail below.

The process 300 also involves providing an error correction current corresponding to the error correction voltage as modified in blocks 350 or 360 to a current control device 116 that controls the output AC current, as depicted in block 370. For example, an error correction current can flow through a current limiting resistor 210 of the voltage error correction device 108 and to a current control device 116. The error correction current can be provided to the base of a transistor 212 of the current control device 116.

The process 300 also involves correcting the output AC current based on the error correction current, as depicted in block 370.

In one non-limiting example, outputting an increased error correction voltage at block 350 can cause an increased error correction current to be provided to the base of the transistor 212. Increasing the error correction current provided to the base of the transistor 212 can increase a current flow from the collector to the emitter of the transistor 212. Increasing the current flow from the collector to the emitter of the transistor 212 can increase the current flowing through primary coil of the power transformer 201 in the electrical path 117. Increasing the current flowing through primary coil of the power transformer 201 can increase the output AC current that is induced in the secondary coil of the power transformer 201 and that is thereby provided to the load device 104.

In another non-limiting example, outputting a decreased error correction voltage at block 360 can cause a decreased error correction current to be provided to the base of the transistor 212. Decreasing the error correction current provided to the base of the transistor 212 can reduce a current flow from the collector to the emitter of the transistor 212. Decreasing the current flow from the collector to the emitter of the transistor 212 can decrease the current flowing through primary coil of the power transformer 201 in the electrical path 117. Decreasing the current flowing through primary coil of the power transformer 201 can decrease the output AC current that is induced in the secondary coil of the power transformer 201 and that is thereby provided to the load device 104.

In some aspects, a current regulator is provided according to one or more of the following examples.

Example 1

A current regulator for regulating AC flow to a load device is provided. The current regulator can include an AC coupling device that can be electrically connected to the load device via an output electrical path, a current control device electrically connected in series with the AC coupling device, and an AC feedback circuit electrically connected to the output electrical path and the current control device. The current control device can modify a current flow through at least one component of the AC coupling device in response to an error correction current received by the current control device. An output AC current provided to the load device can be controlled based on the current flow through the component of the AC coupling device. The AC feedback circuit can include a voltage error compensation device configured to provide the error correction current in response to receiving a feedback voltage corresponding to the output AC current.

Example 2

The current regulator of Example #1 may feature the AC coupling device having a power transformer and the component of the AC coupling device including a primary coil of the power transformer. The primary coil can induce the output AC current in a secondary coil of the power transformer in response to the current flow through the primary coil.

Example 3

The current regulator of Examples #1-2 may feature the current control device including a current mirror that includes at least one transistor. The transistor can include an emitter that is electrically connected to the primary coil and a base that is electrically connected to an output of the voltage error compensation device. The current flow through the primary coil, the emitter, and a collector of the transistor can be modified in response to the error correction current received via the base of the transistor.

Example 4

The current regulator of Examples #1-3 may feature the AC feedback circuit having a current sensing device that is electrically coupled to the output electrical path.

Example 5

The current regulator of Examples #1-4 may feature the AC feedback circuit having a current sensing device. The current sensing device can include a current transformer having a primary coil in the output electrical path and a current sense resistor electrically connected between secondary coil and an input of the voltage error compensation device. The primary coil can induce a feedback current in a secondary coil of the current transformer in response to a flow of the output AC current through the primary coil. The current sense resistor can provide the feedback voltage to the input.

Example 6

The current regulator of Examples #1-6 may feature the voltage error compensation device being configured to provide the error correction current based on comparing the feedback voltage and an input AC voltage.

Example 7

The current regulator of Examples #1-7 may also feature a DC feedback circuit. The DC feedback circuit can include the current control device, a current error compensation device having a first input that is electrically connected to an output of the current control device and a second input that is electrically connectable to a reference DC current source, a summing device having a first input that is electrically connected to an output of the current error compensation device and a second input that is electrically connected to an input AC voltage source, and the voltage error compensation device. The summing device can be configurable. A first input of the voltage error compensation device can receive the feedback voltage and a second input of the voltage error compensation device can be electrically connected to an output of the summing device. The current error compensation device can provide a DC voltage to the summing device. The DC voltage can have an opposite polarity of a DC component of an AC voltage from the input AC voltage source. The summing device can cancel the DC component by summing the DC component with the DC voltage from the current error compensation device.

Example 8

A current regulator for regulating AC current flow to a load device is provided. The current regulator can include a power transformer that can be electrically connected to an output electrical path for providing an output AC current to a load device and that includes a primary coil and a secondary coil, a current mirror including at least one transistor having an emitter electrically connected in series with the primary coil, and an AC feedback circuit electrically connected to the output electrical path and a base of the transistor. The primary coil can induce the output AC current in the secondary coil in response to the current flow through the primary coil. A current flow through the primary coil, the emitter, and a collector of the transistor can be modified in response to an error correction current received via the base of the transistor. The AC feedback circuit can include a voltage error compensation device that can provide the error correction current in response to receiving a feedback voltage corresponding to the output AC current.

Example 9

The current regulator of Example #8 may also feature the AC feedback circuit having a current sensing device electrically coupled to the output electrical path.

Example 10

The current regulator of Examples #8-9 may also feature the AC feedback circuit having a current sensing device. The current sensing device can include a current transformer having an additional primary coil in the output electrical path. The additional primary coil can induce a feedback current in an additional secondary coil of the current transformer in response to a flow of the output AC current through the additional primary coil. The current sensing device can also include a current sense resistor that is electrically connected between the additional secondary coil and an input of the voltage error compensation device. The current sense resistor can provide the feedback voltage to the input.

Example 11

The current regulator of Examples #8-10 may also feature the voltage error compensation device being configured to provide the error correction current based on comparing the feedback voltage and an input AC voltage.

Example 12

The current regulator of Examples #8-10 may also feature a DC feedback circuit. The DC feedback circuit can include the current mirror having at least one additional transistor. The DC feedback circuit can also include a current error compensation device having a first input that is electrically connected to an additional collector of the additional transistor and a second input that is electrically connectable to a reference DC current source. The DC feedback circuit can also include a summing device having a first input that is electrically connected to an output of the current error compensation device and a second input that is electrically connected to an input AC voltage source. The summing device can be configurable. The DC feedback circuit can also include the voltage error compensation device. A first input of the voltage error compensation device can receive the feedback voltage and a second input of the voltage error compensation device can be electrically connected to an output of the summing device. The current error compensation device can provide a DC voltage to the summing device. The DC voltage can have an opposite polarity of a DC component of an AC voltage from the input AC voltage source. The summing device can cancel the DC component by summing the DC component with the DC voltage from the current error compensation device.

Example 13

A method for regulating AC flow to a load device is provided. The method can include generating an output AC current of a current regulator based on an input AC voltage received by the current regulator. The output AC current can be provided to an output electrical path via an AC coupling device of the current regulator. The method can also include modifying an error correction voltage based on a comparison between the input AC voltage and a feedback voltage received via an AC feedback circuit that is electrically connected between the output electrical path and a current control device. The method can also include providing an error correction current to the current control device. The error correction current can correspond to the error correction voltage as modified. The method can also include using the current control device to modify the output AC current based on the error correction voltage.

Example 14

The method of Example #13 may also include the AC coupling device having a power transformer. Generating the output AC current can include causing a current flow through a primary coil of the power transformer. The output AC current can be induced in a secondary coil of the power transformer.

Example 15

The method of Examples #13-14 may also include the current control device having at least one transistor electrically connected in series with the primary coil. Using the current control device to modify the output AC current can include modifying a current flow through the primary coil, a collector of the transistor, and an emitter of the transistor by providing the error correction current to a base of the transistor.

Example 16

The method of Examples #13-15 may also include receiving a feedback current via a current sensing device included in the AC feedback circuit in the output electrical path; providing the feedback voltage to a first input of a voltage error compensation device of the AC feedback circuit, where the feedback voltage corresponds to the feedback current; providing the input AC voltage to a second input of the voltage error compensation device; and using the voltage error compensation device to compare the feedback voltage and the input AC voltage.

Example 17

The method of Examples #13-16 may also include the current sensing device having a current transformer that includes a primary coil in the output electrical path. The output AC current flowing through the primary coil can induce the feedback current in a secondary coil of the current transformer.

Example 18

The method of Examples #13-17 may also include using a DC feedback circuit between an output of the voltage error compensation device and an input of the voltage error compensation device to reduce a DC offset in the input AC voltage.

Example 19

The method of Examples #13-18 may also involve modifying the error correction voltage by outputting an increased error correction voltage based on the input AC voltage being less than the feedback voltage.

Example 20

The method of Examples #13-19 may also include modifying the error correction voltage by outputting a decreased error correction voltage based on the input AC voltage being greater than the feedback voltage.

The foregoing description of the disclosure, including illustrated aspects and examples has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

Aspects and features from each example disclosed can be combined with any other example.

What is claimed is:

1. A current regulator for regulating alternating current (AC) flow to a load device, the current regulator comprising:
    an AC coupling device electrically connectable to the load device via an output electrical path;
    a current mirror comprising at least one transistor electrically connected in series with the AC coupling device, the current mirror configured to modify a current flow through at least one component of the AC coupling device and the at least one transistor in response to an error correction current received by the current mirror, wherein an output AC current provided to the load device is controllable based on the current flow through the at least one component of the AC coupling device; and
    an AC feedback circuit electrically connected to the output electrical path and the at least one transistor, the AC feedback circuit comprising a voltage error compensation device configured to provide the error correction current in response to receiving a feedback voltage corresponding to the output AC current.

2. The current regulator of claim 1, wherein the AC coupling device comprises a power transformer and the at least one component of the AC coupling device comprises a primary coil of the power transformer, wherein the primary coil is configured to induce the output AC current in a secondary coil of the power transformer in response to the current flow through the primary coil.

3. The current regulator of claim 2, wherein the at least one transistor includes an emitter electrically connected to the primary coil and a base electrically connected to an output of the voltage error compensation device, wherein the current is received via the base of the at least one transistor.

4. The current regulator of claim 1, wherein the AC feedback circuit further comprises a current sensing device electrically coupled to the output electrical path.

5. The current regulator of claim 4, wherein the current sensing device comprises:
    a current transformer having a primary coil in the output electrical path, wherein the primary coil is configured to induce a feedback current in a secondary coil of the current transformer in response to a flow of the output AC current through the primary coil; and
    a current sense resistor electrically connected between the secondary coil and an input of the voltage error compensation device, the current sense resistor configured to provide the feedback voltage to the input.

6. The current regulator of claim 1, wherein the voltage error compensation device is configured to provide the error correction current based on comparing the feedback voltage and an input AC voltage.

7. The current regulator of claim 6, further comprising a DC feedback circuit comprising:
    the current mirror;
    a current error compensation device having a first input that is electrically connected to an output of the current mirror and a second input that is electrically connectable to a reference DC current source;
    a summing device having a first input that is electrically connected to an output of the current error compensation device and a second input that is electrically connected to an input AC voltage source, wherein the summing device is configurable; and
    the voltage error compensation device, wherein a first input of the voltage error compensation device is configured to receive the feedback voltage and a second input that is electrically connected to an output of the summing device,
    wherein the current error compensation device is configured to provide a DC voltage to the summing device, the DC voltage having an opposite polarity of a DC component of an AC voltage from the input AC voltage source, wherein the summing device is configured to cancel the DC component by summing the DC component with the DC voltage from the current error compensation device.

8. A current regulator for regulating AC current flow to a load device, the current regulator comprising:
    a power transformer electrically connectable to an output electrical path for providing an output AC current to a load device, the power transformer comprising a primary coil and a secondary coil, wherein the primary coil is configured to induce the output AC current in the secondary coil in response to the current flow through the primary coil;
    a current mirror comprising at least one transistor, the at least one transistor having an emitter electrically connected in series with the primary coil, wherein a current flow through the primary coil, the emitter, and a collector of the at least one transistor is modifiable in response to an error correction current received via a base of the at least one transistor; and
    an AC feedback circuit electrically connected to the output electrical path and the base of the at least one transistor, the AC feedback circuit comprising a voltage error compensation device configured to provide the error correction current in response to receiving a feedback voltage corresponding to the output AC current.

9. The current regulator of claim 8, wherein the AC feedback circuit further comprises a current sensing device electrically coupled to the output electrical path.

10. The current regulator of claim 9, wherein the current sensing device comprises:
    a current transformer having an additional primary coil in the output electrical path, wherein the additional primary coil is configured to induce a feedback current in an additional secondary coil of the current transformer in response to a flow of the output AC current through the additional primary coil; and
    a current sense resistor electrically connected between the additional secondary coil and an input of the voltage error compensation device, the current sense resistor configured to provide the feedback voltage to the input.

11. The current regulator of claim 8, wherein the voltage error compensation device is configured to provide the error correction current based on comparing the feedback voltage and an input AC voltage.

12. The current regulator of claim 11, further comprising a DC feedback circuit comprising:
    the current mirror, wherein the current mirror has at least one additional transistor;
    a current error compensation device having a first input that is electrically connected to an additional collector of the at least one additional transistor and a second input that is electrically connectable to a reference DC current source;
    a summing device having a first input that is electrically connected to an output of the current error compensation device and a second input that is electrically connected to an input AC voltage source, wherein the summing device is configurable; and the voltage error compensation device, wherein a first input of the voltage error compensation device is configured to receive the feedback voltage and a second input that is electrically connected to an output of the summing device, wherein the current error compensation device is configured to provide a DC voltage to the summing device, the DC voltage having an opposite polarity of a DC component of an AC voltage from the input AC voltage source, wherein the summing device is configured to cancel the DC component by summing the DC component with the DC voltage from the current error compensation device.

13. A method for regulating alternating current (AC) flow to a load device, the method comprising:

generating an output AC current of a current regulator based on an input AC voltage received by the current regulator, wherein the output AC current is provided to an output electrical path via an AC coupling device of the current regulator;

modifying an error correction voltage based on a comparison between the input AC voltage and a feedback voltage received via an AC feedback circuit electrically connected between the output electrical path and a current mirror comprising at least one transistor;

providing an error correction current to the current mirror, the error correction current corresponding to the error correction voltage as modified; and using the current mirror to modify the output AC current based on the error correction voltage.

14. The method of claim 13, wherein the AC coupling device comprises a power transformer and wherein generating the output AC current comprises causing a current flow through a primary coil of the power transformer, wherein the output AC current is induced in a secondary coil of the power transformer.

15. The method of claim 14, wherein using the current mirror to modify the output AC current comprises modifying a current flow through the primary coil, a collector of the at least one transistor, and an emitter of the at least one transistor by providing the error correction current to a base of the at least one transistor.

16. The method of claim 13, further comprising:

receiving a feedback current via a current sensing device included in the AC feedback circuit in the output electrical path;

providing the feedback voltage to a first input of a voltage error compensation device of the AC feedback circuit, wherein the feedback voltage corresponds to the feedback current;

providing the input AC voltage to a second input of the voltage error compensation device; and using the voltage error compensation device to compare the feedback voltage and the input AC voltage.

17. The method of claim 16, wherein the current sensing device comprises a current transformer having a primary coil in the output electrical path, wherein the output AC current flowing through the primary coil induces the feedback current in a secondary coil of the current transformer.

18. The method of claim 16, further comprising using a DC feedback circuit between an output of the voltage error compensation device and an input of the voltage error compensation device to reduce a DC offset in the input AC voltage.

19. The method of claim 13, wherein modifying the error correction voltage comprises outputting an increased error correction voltage based on the input AC voltage being less than the feedback voltage.

20. The method of claim 13, wherein modifying the error correction voltage comprises outputting a decreased error correction voltage based on the input AC voltage being greater than the feedback voltage.

* * * * *